United States Patent
Nakamura

(10) Patent No.: US 9,001,350 B2
(45) Date of Patent: Apr. 7, 2015

(54) IMAGE PROCESSING APPARATUS, CONTROL METHOD, AND STORAGE MEDIUM IN WHICH THE LOAD CAN BE SUPPRESSED DURING A MAINTENANCE EVENT

(71) Applicant: Canon Kabushiki Kaisha, Tokyo (JP)

(72) Inventor: Ken Nakamura, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/086,323

(22) Filed: Nov. 21, 2013

(65) Prior Publication Data

US 2014/0153027 A1  Jun. 5, 2014

(30) Foreign Application Priority Data

Nov. 30, 2012  (JP) ................. 2012-262601

(51) Int. Cl.
- G06F 3/12 (2006.01)
- G06K 15/00 (2006.01)
- H04N 1/00 (2006.01)
- H04N 1/32 (2006.01)

(52) U.S. Cl.
CPC ....... H04N 1/00408 (2013.01); H04N 1/00663 (2013.01); H04N 1/00771 (2013.01); H04N 1/3263 (2013.01); H04N 1/32635 (2013.01); H04N 1/32657 (2013.01); H04N 2201/0094 (2013.01)

(58) Field of Classification Search
None
See application file for complete search history.

(56) References Cited

U.S. PATENT DOCUMENTS

| 4,475,806 A | 10/1984 | Daughton et al. ......... 355/14 R |
| 7,830,547 B2 * | 11/2010 | Kolb et al. ...................... 358/1.9 |
| 2004/0057743 A1 * | 3/2004 | McIntyre ........................ 399/81 |
| 2005/0021721 A1 * | 1/2005 | Takahashi et al. ............ 709/223 |
| 2005/0198223 A1 * | 9/2005 | Fujinawa et al. ............. 709/220 |
| 2006/0197970 A1 * | 9/2006 | Barry et al. .................. 358/1.13 |
| 2013/0021641 A1 * | 1/2013 | Park et al. .................... 358/1.14 |

FOREIGN PATENT DOCUMENTS

| JP | 59-78372 A | 5/1984 |
| JP | 08-69223 A | 3/1996 |

* cited by examiner

Primary Examiner — Ming Hon
(74) Attorney, Agent, or Firm — Fitzpatrick, Cella, Harper & Scinto

(57) ABSTRACT

Provided is an image processing apparatus that detects a maintenance event required for the maintenance thereof and displays video data on a screen by reproducing the video data which indicates a maintenance procedure for resolving the detected maintenance event. Then, the image processing apparatus displays a specific scene included in the video data on the screen after completion of reproduction of the video data.

9 Claims, 6 Drawing Sheets

IMAGE PROCESSING APPARATUS, CONTROL METHOD, AND STORAGE MEDIUM IN WHICH THE LOAD CAN BE SUPPRESSED DURING A MAINTENANCE EVENT

BACKGROUND OF THE INVENTION

1. Field of the Invention

The present invention relates to an image processing apparatus, a control method, and a storage medium.

2. Description of the Related Art

Conventionally, there has been proposed an image processing apparatus that displays information for urging a maintenance operation for recovering a failure on a screen upon occurrence of the failure for disabling printout. For example, Japanese Patent Laid-Open No. S59-78372 discloses an image processing apparatus that displays an operation procedure for releasing a jam condition by means of illustration or message when processing such as paper jamming, toner replenishing, or the like is necessary. Also, Japanese Patent Laid-Open No. H8-69223 discloses an image processing apparatus that reproduces and displays video data about a jam processing procedure performed by a sheet-passing unit on an operation unit. In the following description, video indicating a maintenance operation for recovering a failure is described as "maintenance video" and a screen on which maintenance video is to be displayed is described as a "maintenance screen".

When execution of maintenance operation needs to be prompted to a user by displaying the maintenance procedure again despite the fact that maintenance video being displayed on a screen has been reproduced to the end, an image processing apparatus for repeating reproduction of the maintenance video is contemplated.

However, if reproduction of the maintenance video is repeated by the image processing apparatus, the load (CPU usage rate) on the image processing apparatus increases, resulting in a negative influence on other processing performed by the CPU. Other processing performed by the CPU during reproduction of the maintenance video is, for example, a print operation while a toner replacement screen is being displayed. If the image processing apparatus is adapted to stop reproduction of the maintenance video upon completion of reproduction of the maintenance video in order to suppress the CPU usage rate, an operation needed to be prompted for execution may not be notified to a user.

SUMMARY OF THE INVENTION

The present invention provides an image forming apparatus in which the load on the image forming apparatus is suppressed when information for urging execution of necessary maintenance is reported to a user after completion of reproduction of video indicating the maintenance procedure for recovering the failure that has occurred.

According to an aspect of the present invention, an image processing apparatus is provided that includes a detection unit configured to detect a maintenance event required for the maintenance of the image processing apparatus; and a display unit configured to display video data on a screen by reproducing the video data indicates a maintenance procedure for resolving the detected maintenance event. The display unit displays a specific scene included in the video data on a screen after completion of reproduction of the video data.

According to the image processing apparatus of the present invention, the load on the image forming apparatus can be suppressed when information for urging execution of necessary maintenance is reported to a user after completion of reproduction of video indicating the maintenance procedure for recovering the failure that has occurred.

Further features of the present invention will become apparent from the following description of exemplary embodiments with reference to the attached drawings.

DESCRIPTION OF THE EMBODIMENTS

First Embodiment

Figure 1:
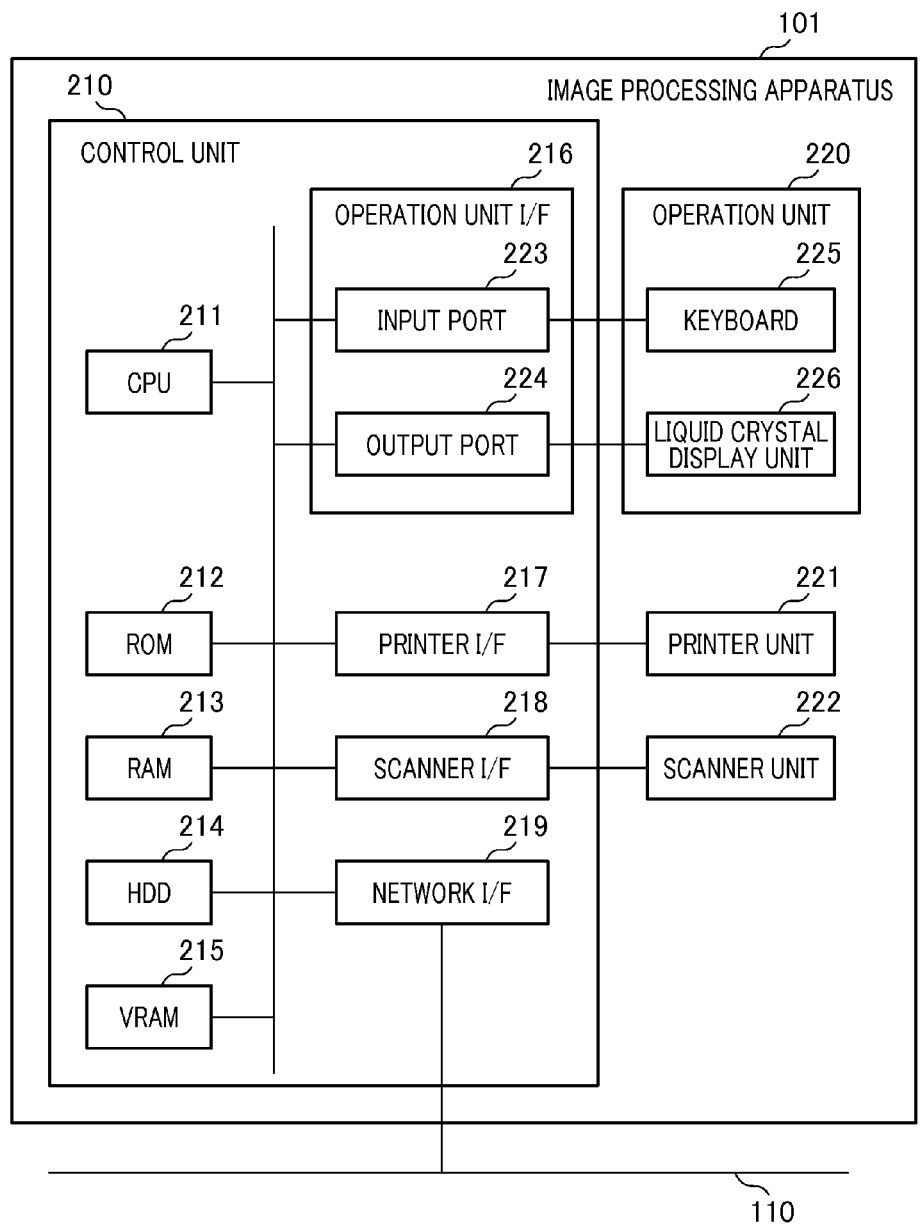
FIG. 1 is a hardware block diagram illustrating a configuration of an image processing apparatus.

FIG. 1 is a hardware block diagram illustrating an exemplary configuration of an image processing apparatus of the present embodiment. An image processing apparatus 101 executes image processing (generation, output, and the like of image data). The image processing apparatus 101 is, for example, a printer or a facsimile.

The image processing apparatus 101 includes a control unit 210, an operation unit 220, a printer unit 221, and a scanner unit 222. The control unit 210 controls the entire image processing apparatus 101. The operation unit 220 inputs and displays various types of information in response to a user's operation.

The control unit 210 includes a CPU 211, a ROM 212, a RAM 213, an HDD 214, and a VRAM 215, where CPU is an abbreviation for Central Processing Unit, ROM is an abbreviation for Read Only Memory, RAM is an abbreviation for Random Access Memory, HDD is an abbreviation for Hard Disk Drive, and VRAM is an abbreviation for Video RAM. The control unit 210 also includes an operation unit I/F (Interface) 216, a printer I/F 217, a scanner I/F 218, and a network I/F 219.

The CPU 211 reads out a computer program (control program) stored in the ROM 212 to thereby execute various control processing such as read-out control, transmission control, and the like. The RAM 213 is used as a temporal storage region such as a main memory, a work area, or the like for the CPU 211. The HDD 214 stores image data, various types of programs, and various types of information tables. The VRAM 215 is a memory for holding display screen data generated by the CPU 211.

The operation unit I/F 216 connects the operation unit 220 with the control unit 210. The operation unit 220 includes a liquid crystal display unit 226 having a touch panel function and a keyboard 225. When a user operates the keyboard 225, the operation unit I/F 216 acquires operation content via an input port 223. Also, the operation unit I/F 216 passes the acquired operation content to the CPU 211. The CPU 211 generates display screen data based on the passed operation content and the aforementioned control program. The VRAM 215 holds the generated display screen data. The display screen data held by the VRAM 215 is output to the liquid crystal display unit 226 via an output port 224 for controlling screen output.

The printer I/F 217 connects the printer unit 221 with the control unit 210. The control unit 210 transfers image data to be printed by the printer unit 221 to the printer unit 221 via the printer I/F 217. Then, the printer unit 221 prints and outputs image data on a recording medium.

The scanner I/F 218 connects the scanner unit 222 with the control unit 210. The scanner unit 222 generates image data by reading out an image on an original and inputs the generated image data to the control unit 210 via the scanner I/F 218. The network I/F 219 connects the control unit 210 (the image processing apparatus 101) to LAN 110. The network I/F 219 transmits and receives various types of information to and from other devices on the LAN 110.

Figure 2:
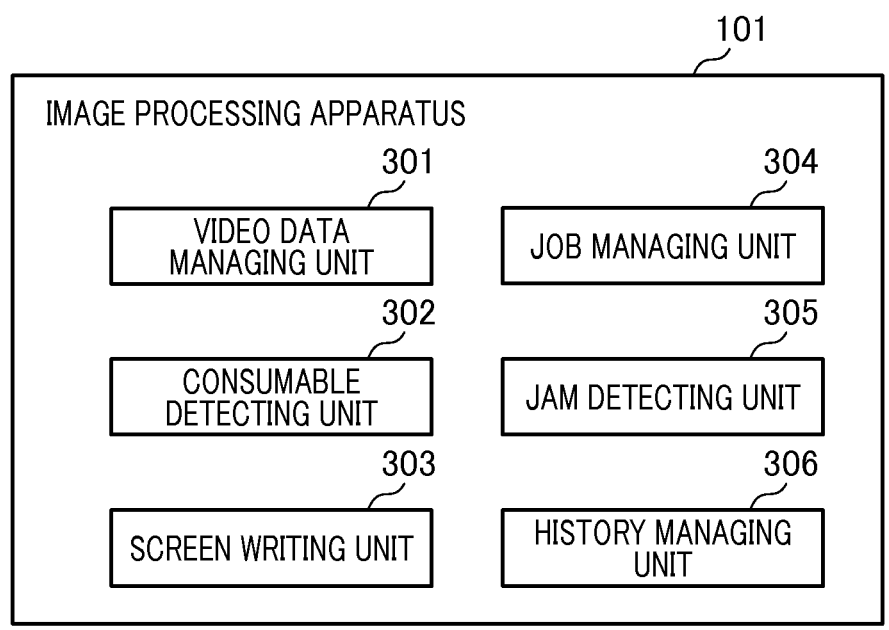
FIG. 2 is a diagram illustrating an exemplary software configuration of an image processing apparatus.

FIG. 2 is a diagram illustrating an exemplary software configuration of an image processing apparatus. The respective functional units shown in FIG. 2 are realized by reading out and executing the control program stored in the ROM 212 or the HDD 214 by the CPU 211 provided in the image processing apparatus 101.

The image processing apparatus 101 includes a video data managing unit 301, a consumable detecting unit 302, a screen writing unit 303, a job managing unit 304, a jam detecting unit 305, and a history managing unit 306.

The video data managing unit 301 manages video data by storing it in the RAM 213 or the HDD 214. The video data managing unit 301 manages, for example, maintenance video. Maintenance video is video data indicating a procedure of maintenance for resolving a maintenance event such as a failure of which the occurrence has been detected by the image processing apparatus 101. The video data managing unit 301 manages maintenance video by associating it with a location where the detected failure has occurred.

The consumable detecting unit 302 detects the remaining amount of consumables provided in the interior of the image processing apparatus 101. Examples of consumables include toners, staple needles, paper sheets, and the like. When the remaining amount of the detected consumables is equal to or less than a threshold value, the consumable detecting unit 302 determines that an event required for a maintenance operation, i.e., a failure has occurred in the image processing apparatus 101. When consumables of which the remaining amount has become equal to or less than a threshold value are replaced with new ones, the consumable detecting unit 302 detects that the failure occurred in the image processing apparatus 101 has been eliminated. Also, the consumable detecting unit 302 detects whether or not the amount of a waste material accumulated in the interior of the image processing apparatus 101, such as punched chip, waste toner, or the like, is equal to or greater than a threshold value. When the amount of the waste material is equal to or greater than a threshold value, the consumable detecting unit 302 determines that a failure has occurred in the image processing apparatus 101. When the waste material is discarded, the consumable detecting unit 302 detects that the failure occurred in the image processing apparatus 101 has been eliminated.

The screen writing unit 303 generates and displays a screen to be displayed on the operation unit 220. Also, the screen writing unit 303 reproduces maintenance video managed by the video data managing unit 301 and then displays the reproduced maintenance video on the operation unit 220. Further, the screen writing unit 303 displays a specific scene included in maintenance video on a screen after completion of reproduction of the maintenance video.

The job managing unit 304 manages job setting information such as a start time of a job in processing, a job type, a document name, the number of sheets, the number of copies, presence/absence of stapling, and the like by storing it in the RAM 213 or the HDD 214. The job type is the type of a job performed by the image processing apparatus 101, such as copy, print, send, save, or the like.

The jam detecting unit 305 detects the paper jam occurred in the image processing apparatus 101. Also, the jam detecting unit 305 specifies a location at which paper jam has occurred and then sets a jam-occurred flag to the location. The jam-occurred flag is a flag indicating that a paper jam has occurred. Also, when the paper jam is eliminated by maintenance, the jam detecting unit 305 detects that the paper jam occurred in the image processing apparatus 101 has been eliminated. In other words, the consumable detecting unit 302 and the jam detecting unit 305 detect a failure occurred in the image processing apparatus 101 and resolution of the failure.

The history managing unit 306 manages the type of maintenance, a time at which maintenance becomes necessary, a time of completion of maintenance, and the like by storing them in the RAM 213 or the HDD 214. Also, the history managing unit 306 receives information such as a location at which paper jam has occurred, a time of occurrence of paper jam, a time of elimination of paper jam, and the like from the jam detecting unit 305 and manages the received information as a history of occurrence of paper jam.

Figure 3:
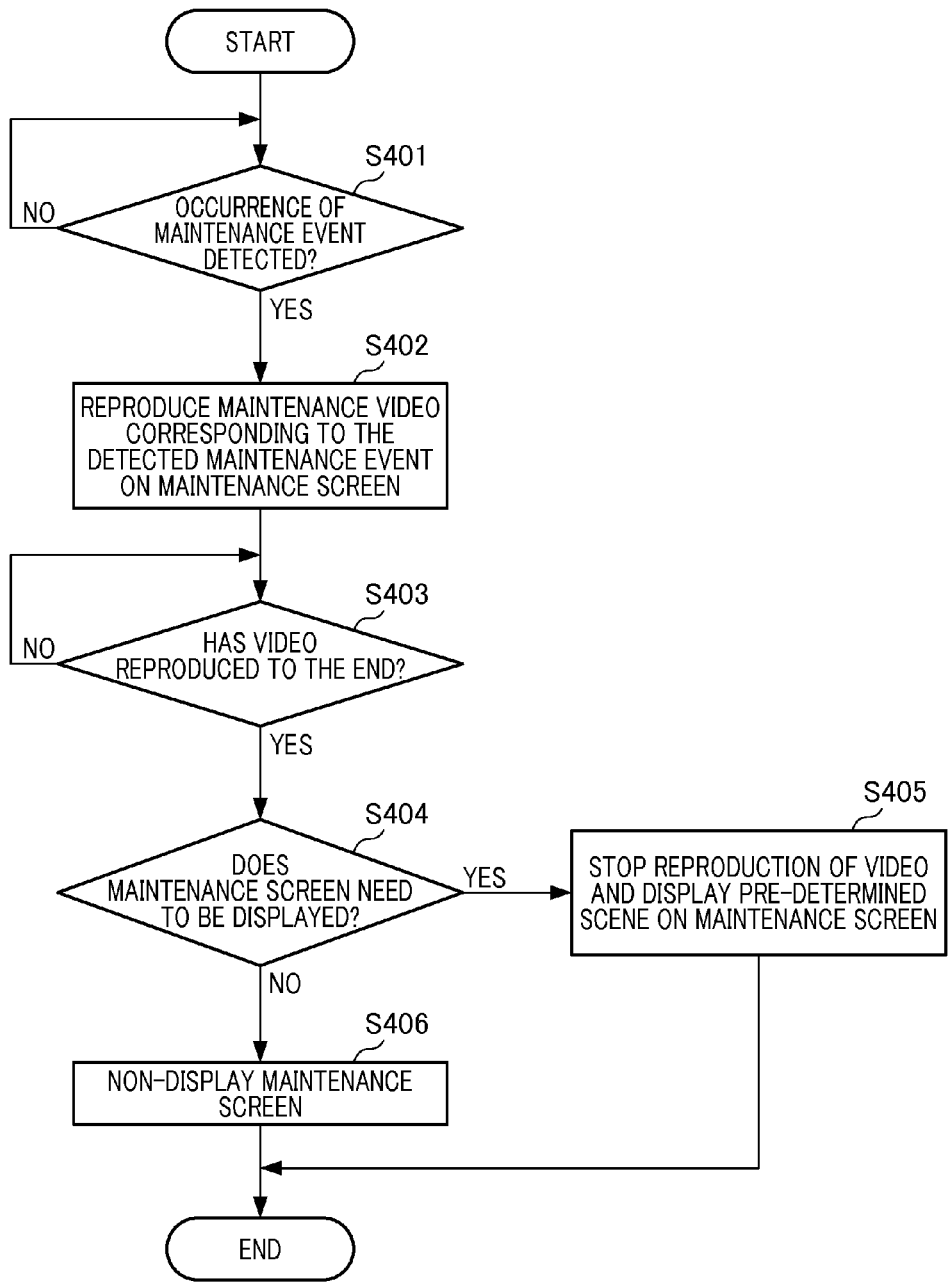
FIG. 3 is a flowchart illustrating an example of operation processing performed by an image processing apparatus.

FIG. 3 is a flowchart illustrating an example of operation processing performed by an image processing apparatus according to a first embodiment. The processes corresponding to the steps shown in the flowchart in FIG. 3 are realized by executing the respective control programs by the CPU 211 provided in the image processing apparatus 101.

Firstly, the consumable detecting unit 302 and the jam detecting unit 305 determine whether or not an event for which the maintenance operation is required has occurred (S401). When no event for which the maintenance operation is required has occurred, the process returns to S401. When an event for which the maintenance operation is required has occurred, the process advances to S402.

Next, the video data managing unit 301 receives the detected event from the consumable detecting unit 302 and the jam detecting unit 305. The video data managing unit 301 acquires maintenance video corresponding to the received event from the RAM 213 or the HDD 214 and then passes the maintenance video to the screen writing unit 303. Then, the screen writing unit 303 displays and reproduces the received maintenance video on the maintenance screen of the operation unit 220.

Next, the video data managing unit 301 determines whether or not the maintenance video reproduced in S402 has been reproduced to the end (whether or not reproduction has been completed) (S403). When the maintenance video has not been reproduced to the end, the process returns to S403 and the screen writing unit 303 continues reproduction. When the maintenance video has been reproduced to the end, the process advances to S404.

Next, the video data managing unit 201 determines whether or not the maintenance screen needs to be displayed (S404). In S404, the video data managing unit 201 determines whether or not an event for which the maintenance operation is required has been completed based on the detection result of the consumable detecting unit 302 and the jam detecting unit 305. More specifically, the video data managing unit 201 determines whether or not failure resolution caused by maintenance corresponding to the reproduction-completed maintenance video has been detected. When failure resolution caused by maintenance has been detected, the video data managing unit 201 determines that the maintenance screen does not need to be displayed, and the process advances to S406. When failure resolution caused by maintenance has not been detected, the video data managing unit 201 determines that the maintenance screen needs to be displayed, and the process advances to S405.

In S405, the video data managing unit 301 stops reproduction of the maintenance video reproduced in S402. Then, the screen writing unit 303 displays a predetermined video scene desired to be viewed by a user in accordance with the instruction given by the video data managing unit 201 (S405). The video scene desired to be viewed by a user is, for example, a scene that is capable of prompting a user to perform processing by being looked at by the user, such as a maintenance video scene for toner replacement in which a toner is being removed. The video scene desired to be viewed by a user may be one or plural. When such a video scene is one, the screen writing unit 303 displays it, whereas when such a video scene is plural, the screen writing unit 303 displays the most appropriate scene by taking into account the state of maintenance.

Note that the video data managing unit 201 may also specify a procedure to be currently executed by monitoring the execution process of maintenance corresponding to a failure based on the detection result obtained by the consumable detecting unit 302 and the jam detecting unit 305. Then, after completion of reproduction of the maintenance video, the screen writing unit 303 may also display a scene corresponding to the specified procedure to be currently executed from among scenes corresponding to the procedure of maintenance corresponding to the failure.

In S406, the screen writing unit 303 stops the reproduced maintenance video displayed on the operation unit 220 to thereby end display of the video.

Figure 4:
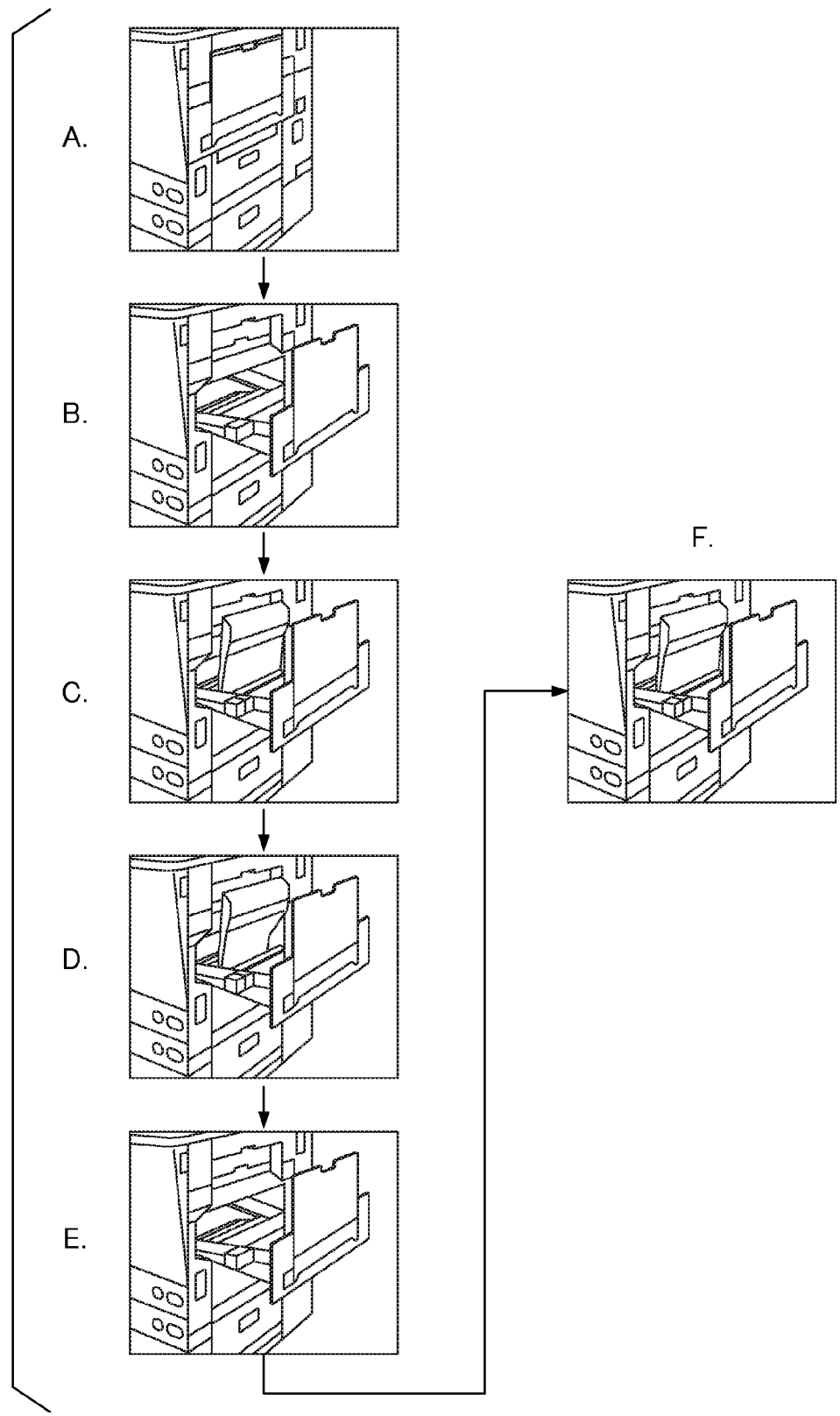
FIGS. 4A to 4F are examples of operation scenes included in maintenance video to be reproduced and displayed.

FIGS. 4A to 4F are examples of operation scenes included in maintenance video to be reproduced and displayed in accordance with the flowchart described with reference to FIG. 3. In FIG. 4, a description will be given by taking examples of video scenes included in maintenance video upon occurrence of paper jam. The video scene shown in FIG. 4C is intended to be a predetermined video scene desired to be viewed by a user.

Reproduction is sequentially executed from the video scene shown in FIG. 4A to the video scene shown in FIG. 4E. When an event for which the maintenance operation is required has not been completed after reproduction of the video scene shown in FIG. 4E, the screen writing unit 303 displays the video scene shown in FIG. 4F, which is the same video scene as that shown in FIG. 4C, on the maintenance screen.

According to the present embodiment, when the maintenance procedure needs to be displayed even after completion of reproduction of the maintenance video, reproduction of the maintenance video is interrupted and then a specific scene is displayed so that a user can be prompted to efficiently perform processing while suppressing the CPU usage rate.

Second Embodiment

Next, a description will be given of a second embodiment. The image processing apparatus 101 of the second embodiment determines the state of a job in processing to thereby display maintenance video. Here, a description will only be given of the difference from the first embodiment.

Figure 5:
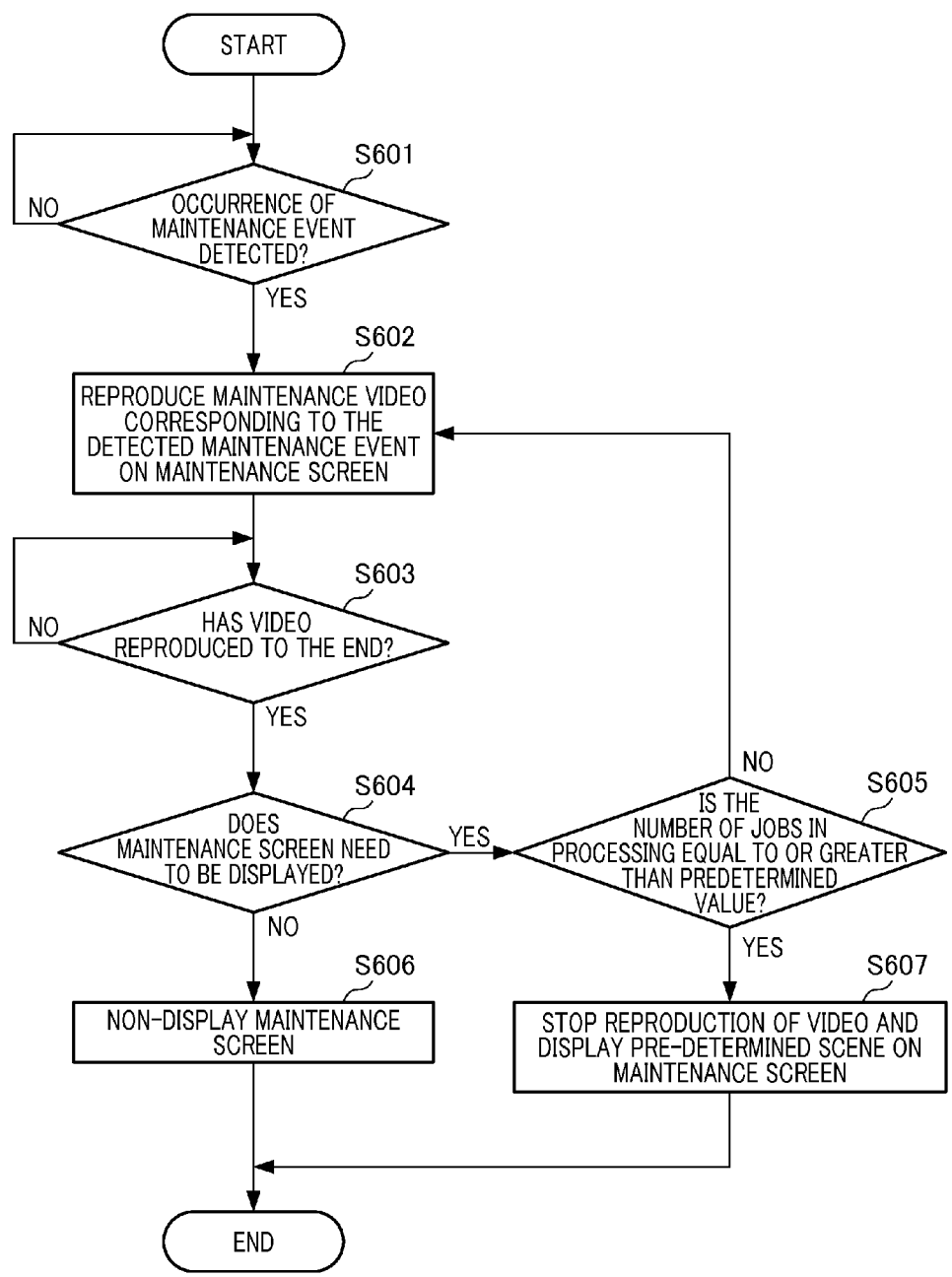
FIG. 5 is a flowchart illustrating an example of operation processing performed by an image processing apparatus.

FIG. 5 is a flowchart illustrating an example of operation processing performed by the image processing apparatus of the second embodiment. The operations shown in the flowchart in FIG. 5 are realized by executing the respective control programs by the CPU 211 provided in the image processing apparatus 101. Steps S601 to S604, S606, and S607 are the same as steps S401 to S404, S406, and S407 shown in FIG. 3, and thus, explanation thereof will be omitted.

In S605, the job managing unit 304 determines whether or not the number of jobs in processing in the image processing apparatus 101 is equal to or greater than a predetermined value (S605). The job in processing is, for example, a job for which processing has been started prior to display of the maintenance screen. The job in processing may also be a job for which processing has been started after the maintenance screen is displayed by the image processing apparatus 101. The fact that the number of jobs in processing is equal to or greater than a predetermined value means that the load on the image processing apparatus depending on job processing during execution is equal to or greater than a predetermined threshold value. The load on the image processing apparatus 101 is, for example, the sum of the CPU usage rate depending on job processing and the CPU usage rate depending on reproduction processing of the maintenance video. When the number of jobs in processing is equal to or greater than a predetermined value, the process advances to S607. When the number of jobs in processing is less than a predetermined value, the process advances to S602. In other words, when a failure is not eliminated after completion of video reproduction, the video is reproduced again if the CPU usage rate is not too high. When the video is reproduced again, the video may be reproduced from the beginning or the middle thereof. For example, the video data managing unit 201 specifies a procedure to be currently executed by monitoring the execution process of maintenance corresponding to a failure based on the detection result obtained by the consumable detecting unit 302 and the jam detecting unit 305. Then, the screen writing unit 303 may reproduce video from the scene corresponding to the specified procedure to be currently executed.

The image processing apparatus of the present embodiment determines whether video is reproduced or a specific scene is displayed based on the state of a job in processing when the maintenance procedure needs to be displayed even after reproduction of the maintenance video. Thus, according to the image processing apparatus of the present embodiment, a user can be prompted to perform processing by efficiently using the CPU.

Third Embodiment

Next, a description will be given of a third embodiment. The image processing apparatus of the third embodiment determines the type of maintenance video being displayed on the image processing apparatus to thereby display the maintenance video. Here, a description will only be given of the difference from the first embodiment.

Figure 6:
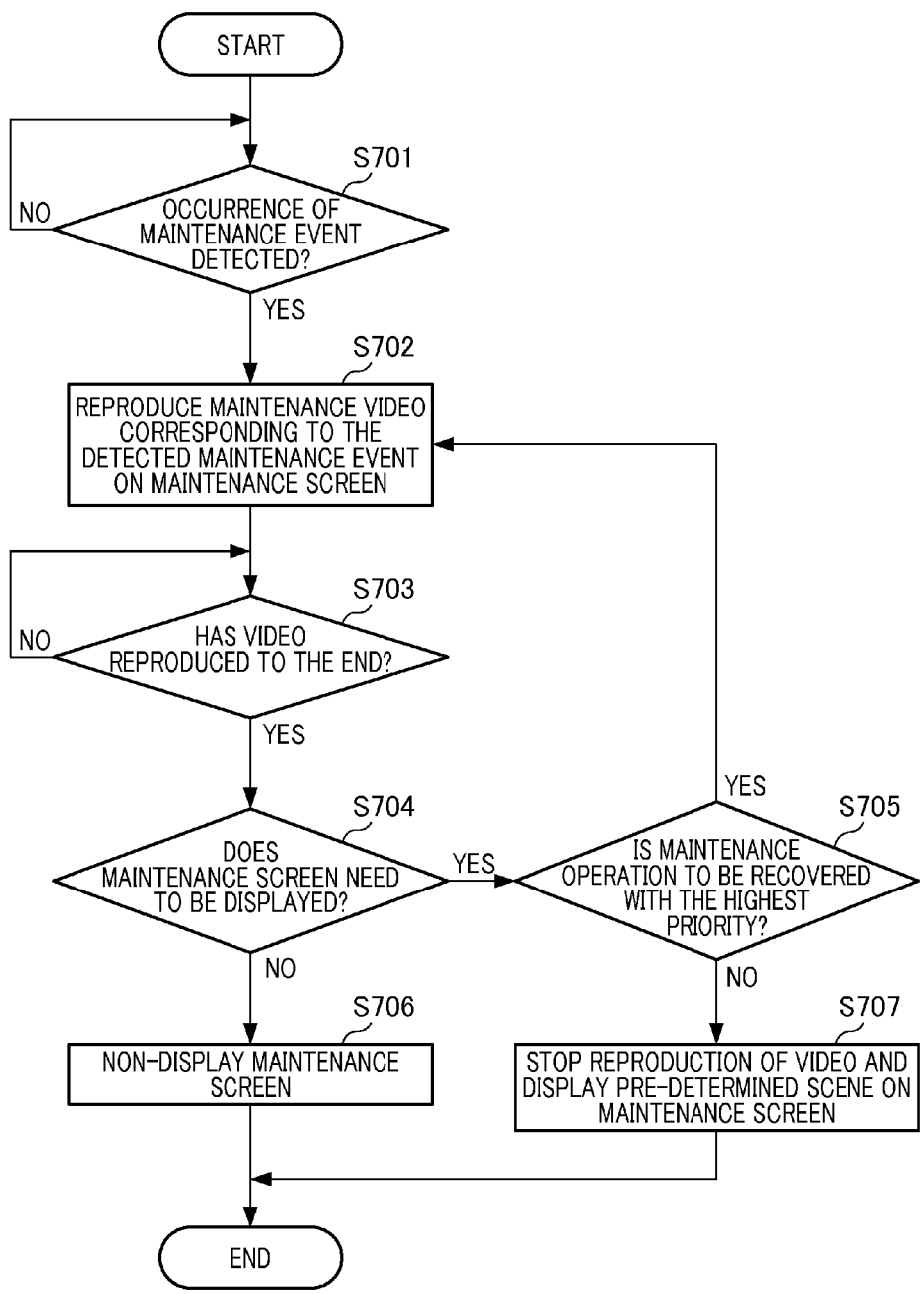
FIG. 6 is a flowchart illustrating an example of operation processing performed by an image processing apparatus.

FIG. 6 is a flowchart illustrating an example of operation processing performed by the image processing apparatus of the third embodiment. The operations shown in the flowchart in FIG. 6 are realized by executing the respective control programs by the CPU 211 provided in the image processing apparatus 101. Steps S701 to S704, S706, and S707 are the same as steps S401 to S404, S406, and S407 shown in FIG. 3, and thus, explanation thereof will be omitted.

In S705, the video data managing unit 301 determines whether or not the reproduction-completed maintenance video is maintenance video corresponding to a predetermined maintenance operation to be recovered with the highest priority. The maintenance operation to be recovered with the highest priority is a maintenance operation for recovering a failure which greatly affects the operation performed by the image processing apparatus 101, such as paper jam in a state where a plurality of copy jobs or print jobs is being executed.

When the reproduction-completed maintenance video is maintenance video corresponding to the maintenance operation to be recovered with the highest priority, the process advances to S702. When the reproduction-completed maintenance video is not maintenance video corresponding to the maintenance operation to be recovered with the highest priority, the process advances to S707. In other words, when a failure is not eliminated after completion of video reproduction but the failure needs to be recovered with the highest priority, the video is reproduced again even if the CPU usage rate is slightly high. When the video is reproduced again, the video may be reproduced from the beginning or the middle thereof. For example, the video data managing unit 201 specifies a procedure to be currently executed by monitoring the execution process of maintenance corresponding to a failure based on the detection result obtained by the consumable detecting unit 302 and the jam detecting unit 305. Then, the screen writing unit 303 may reproduce video from the scene corresponding to the specified procedure to be currently executed.

The image processing apparatus of the present embodiment can determine whether video is reproduced or a specific scene is displayed depending on the type of maintenance video being displayed when the maintenance procedure needs to be displayed even after completion of reproduction of the maintenance video.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-262601 filed on Nov. 30, 2012, which is hereby incorporated by reference herein in its entirety.

What is claimed is:

1. An image processing apparatus comprising:
   a first detection unit configured to detect a maintenance event required for a maintenance of the image processing apparatus;
   a display unit configured to display video data on a screen by reproducing the video data which indicates a maintenance procedure for resolving the detected maintenance event;
   a second detection unit configured to detect resolution of the maintenance event; and
   a display control unit configured to control to end displaying the video data in accordance with the detection of the resolution of the maintenance event by the second detection unit,
   wherein, after completion of reproduction of the video data, the display control unit stops the reproduced maintenance video and displays a specific scene included in the video data among a plurality of scenes other than a first and a last scene, when the resolution of the maintenance event is not detected by the second detection unit.

2. The image processing apparatus according to claim 1, further comprising:
   a first determination unit configured to determine a load on the image processing apparatus depending on job processing,
   wherein, after completion of reproduction of the video data, the display control unit switches to reproduce the video data again or to display the specific scene based on the load that is determined by the first determination unit, when the resolution of the maintenance event is not detected by the second detection unit.

3. The image processing apparatus according to claim 2, wherein the first determination unit determines whether or not the load is equal to or greater than a predetermined threshold value,
   wherein the display control unit controls to display the specific scene on the screen when the first determination unit determines that the load is equal to or greater than the predetermined threshold value, and to reproduce the video data again when the first determination unit determines that the load is not equal to or greater than the predetermined threshold value.

4. The image processing apparatus according to claim 3, wherein the load on the image processing apparatus is the CPU usage rate of the image processing apparatus.

5. The image processing apparatus according to claim 1, further comprising:
   a second determination unit configured to determine whether or not the reproduction-completed video data is video data indicating a maintenance procedure upon occurrence of a predetermined maintenance event to be resolved with the highest priority,
   wherein the display control unit controls to display the specific scene on the screen when the second determination unit determines that the reproduction-completed video data is not video data indicating the maintenance procedure upon occurrence of the predetermined maintenance event to be resolved with the highest priority and to reproduce the video data again when the second determination unit determines that the reproduction-completed video data is the video data indicating the maintenance procedure upon occurrence of the predetermined maintenance event to be resolved with the highest priority.

6. The image processing apparatus according to claim 5, wherein the maintenance event to be resolved with the highest priority is paper jam that has occurred during execution of a plurality of jobs by the image processing apparatus.

7. The image processing apparatus according to claim 1, further comprising:
   a monitor unit configured to specify a procedure to be currently executed by monitoring the execution process of maintenance corresponding to the maintenance event,
   wherein, after completion of reproduction of the video data, the display control unit controls to display a scene which corresponds to the procedure to be currently executed specified by the monitor unit from among scenes corresponding to the procedure of maintenance corresponding to the maintenance event as the specific scene on the screen, when the resolution of the maintenance event is not detected by the second detection unit.

8. A method for controlling an image processing apparatus, the method comprising the steps of:

detecting a maintenance event required for the maintenance of the image processing apparatus;

displaying video data on a screen by reproducing the video data which indicates a maintenance procedure for resolving the detected maintenance event;

detecting resolution of the maintenance event; and controlling to end displaying the video data in accordance with the detection of the resolution of the maintenance event, wherein the reproduced maintenance video is stopped and a specific scene included in the video data among a plurality of scenes other than a first and a last scene is displayed in the controlling step after completion of reproduction of the video data, when the resolution of the maintenance event is not detected.

9. A non-transitory storage medium on which is stored a computer program for making a computer execute a method for controlling an image processing apparatus, the method comprising the steps of:

detecting a maintenance event required for the maintenance of the image processing apparatus;

displaying video data on a screen by reproducing the video data which indicates a maintenance procedure for resolving the detected maintenance event;

detecting resolution of the maintenance event; and controlling to end displaying the video data in accordance with the detection of the resolution of the maintenance event, wherein the reproduced maintenance video is stopped and a specific scene included in the video data among a plurality of scenes other than a first and a last scene is displayed in the controlling step after completion of reproduction of the video data, when the resolution of the maintenance event is not detected.

* * * * *